Patented Dec. 4, 1928.

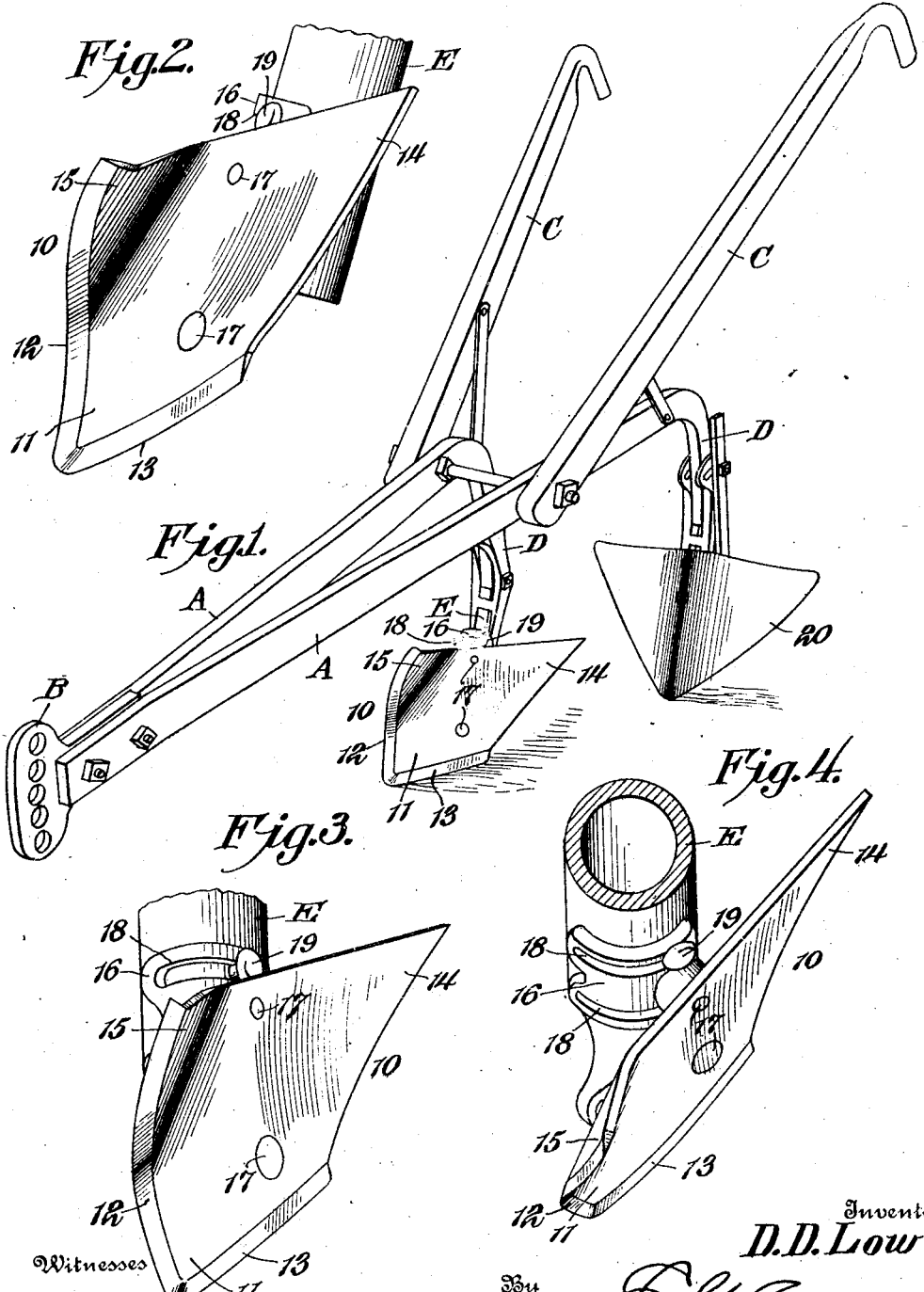

1,694,099

UNITED STATES PATENT OFFICE.

DAVE DUNLOP LOW, OF MONT HELENA, MISSISSIPPI.

CULTIVATOR BLADE OR SOD SCRAPER.

Application filed September 14, 1926. Serial No. 135,377.

This invention relates to agricultural implements, particularly to cultivators, and has for its object the provision of a novel cultivator blade adapted to be used in connection with implements of either the walking or riding type and in conjunction with some suitable sweep, the blade having such shape or formation as to cut and tear up sod of all kinds and toss it away from the row of plants being cultivated.

An important object of the invention is the provision of a blade which acts to cut and also to scrape so that the most tenacious sods may be effectually removed from the vicinity of a row of growing plants, the blade being preferably used in advance of a sweep or shovel which will act to close the furrow made by the blade while leaving the soil in a loosened and proper condition to permit the growth of the plants, the closing of the furrow being of advantage in avoiding likelihood of the young plants being washed down and away in case of heavy rains.

A further object of the invention is the provision of a cultivator blade of this character having a portion so formed as to deflect the torn up sod to one side and thereby prevent it from ever falling onto the young plants.

An additional object is the provision of a blade which may be formed as a right or left so that a number can be used when it is desired to work upon a plurality of rows, as in the case with gang plows and cultivators.

The invention further contemplates simple attaching means whereby the blade may be mounted upon a suitable foot and adjusted with respect thereto to bring it into proper operative relation to the surface traveled over for insuring thorough action.

Another object is to provide a device of this character which will be simple and inexpensive to manufacture, easy to apply, positive in action, efficient and durable in service and a general improvement in the art.

With the above and other objects and advantages in view, the invention consists in the combination and arrangement of parts to be hereinafter more fully described and claimed and illustrated in the accompanying drawings, in which:

Figure 1 is a perspective view of a simple type of walking cultivator showing the blade mounted thereon.

Figure 2 is a side view of the blade on a larger scale and showing it associated with a fragment of the supporting foot.

Figure 3 is a front view of the blade and support.

Figure 4 is a view looking down on the blade, the attaching or mounting means being also disclosed.

Referring more particularly to the drawings, Figure 1 discloses a conventional type of walking cultivator including beams A connected with a draft device B and carrying handles C. The beams have their rear ends extending downwardly, as indicated at D, and these ends carry foot members E secured thereto or formed thereon, such details being immaterial though the foot members are disclosed as preferably cylindrical in shape. Ordinarily one foot piece is in advance of the other, as illustrated.

Carried by the forward foot piece is my novel blade indicated as a whole by the numeral 10. This blade is formed from a single piece of steel shaped in a manner to be described, and of course hardened or otherwise treated in the customary manner so as to have proper durability. This blade is shown as having a substantial diamond shape and includes a point portion 11 defined between forward and bottom edges 12 and 13, respectively, both of which are beveled off by grinding or the like to define cutting edges, the forward edge being adapted to cut through sod and the like and the lower edge having more of a scraping action. This blade is preferably curved transversely to a limited extent, as particularly illustrated in Figure 3 and has a rearwardly extending wing 14 which is nearly flat or plane, but which is extended to be located at an inclination or acute angle with respect to the line of draft. The upper forward corner 15 is more abruptly curved than the major forward portion to define means for deflecting earth, sod, roots and the like away from the row of plants being cultivated, it being clear that the cultivator is used with the blade in substantially upright position with the convex side thereof disposed toward the row of plants.

Any suitable means may be provided for attaching the blade to the foot piece though in the present instance I have shown a bracket member 16 riveted or otherwise suitably secured at 17 to the blade, the bracket member being concaved or otherwise shaped to fit conformingly against the foot piece and being formed with slots 18 for the passage of securing bolts 19 or the like which enter the foot piece. Obviously, this particular means for mounting permits adjustment of the blade rotatably with respect to the foot piece so that it may be placed at the proper position with respect to the surface traveled over and the line of draft to insure proper action.

To avoid leaving a furrow after the blade has performed its work, use may be made of a suitable sweep 20 mounted in any convenient manner on the rear foot member, the intention being that the sweep or shovel be located in such position as to fill in the furrow left by the blade. The furrow will of course be filled with thoroughly broken up or loosened soil and this will promote growth of the plants. Filling of the furrow has the additional advantage of reducing likelihood of the young plants being washed down in case of heavy rains.

From the foregoing description and a study of the drawing it will be readily apparent that I have thus provided a simply constructed and inexpensive blade capable of use upon any type of cultivator for working upon single rows or a plurality. Obviously, rights and lefts may be provided for use upon cultivators of the gang type or upon other equivalent ground preparing implements, there being no limitations in this respect.

While I have shown and described the preferred embodiment of the invention, together with a certain specific shape of blade, it should be understood that I reserve the right to make whatever changes or modifications may be found desirable provided such constitute no departure from the spirit of the invention or the scope of the claim hereunto appended.

What is claimed is:

A concavo-convex, diamond-shaped cultivator blade having a substantially vertical curved forward cutting edge; a substantially horizontal cutting edge merging into the said vertical edge and forming a sharp cutting point; a rearwardly pointed moldboard portion; and approximately vertically alined securing means to secure said blade to a cultivator standard; said forward cutting portion of the blade having a forwardly projecting lip at the upper portion thereof and said vertical and horizontal portions of the blade being beveled at the front and rear of the blade to form said cutting edges.

In testimony, that I claim the foregoing as my own, I have hereto affixed my signature.

DAVE DUNLOP LOW.